United States Patent
Wang et al.

(10) Patent No.: US 10,438,077 B2
(45) Date of Patent: Oct. 8, 2019

(54) FACE LIVENESS DETECTION METHOD, TERMINAL, SERVER AND STORAGE MEDIUM

(71) Applicant: TENCENT TECHNOLOGY (SHENZHEN) COMPANY LIMITED, Shenzhen (CN)

(72) Inventors: Chengjie Wang, Shenzhen (CN); Jilin Li, Shenzhen (CN); Feiyue Huang, Shenzhen (CN); Yongjian Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 15/728,178

(22) Filed: Oct. 9, 2017

(65) Prior Publication Data
US 2018/0032828 A1 Feb. 1, 2018

Related U.S. Application Data (63) Continuation of application No. PCT/CN2016/084677, filed on Jun. 3, 2016.

(30) Foreign Application Priority Data

Dec. 18, 2015 (CN) .......................... 2015 1 0964347

(51) Int. Cl.
*G06K 9/00* (2006.01)
*G06K 9/66* (2006.01)

(52) U.S. Cl.
CPC ..... *G06K 9/00906* (2013.01); *G06K 9/00255* (2013.01); *G06K 9/00288* (2013.01); *G06K 9/66* (2013.01)

(58) Field of Classification Search
CPC ........... G06K 9/00906; G06K 9/00255; G06K 9/00288; G06K 9/66
See application file for complete search history.

(56) References Cited

U.S. PATENT DOCUMENTS

| 6,580,810 B1 | 6/2003 | Yang et al. |
| 7,659,920 B2 * | 2/2010 | Cohen ................ G06K 9/00268 348/14.01 |

(Continued)

FOREIGN PATENT DOCUMENTS

| CN | 101216887 A | 7/2008 |
| CN | 102375970 A | 3/2012 |

(Continued)

OTHER PUBLICATIONS

The World Intellectual Property Organization (WIPO) International Search Report for PCT/CN2016/084677 dated Sep. 2, 2016 5 Pages (including translation).

(Continued)

*Primary Examiner* — Gregory M Desire
(74) *Attorney, Agent, or Firm* — Anova Law Group, PLLC (57) ABSTRACT

A face liveness detection method includes outputting a prompt to complete one or more specified actions in sequence within a specified time period, obtaining a face video, detecting a reference face image frame in the face video using a face detection method, locating a facial keypoint in the reference face image frame, tracking the facial keypoint in one or more subsequent face image frames, determining a state parameter of one of the one or more specified actions using a continuity analysis method according to the facial keypoint, and determining whether the one of the one or more specified actions is completed according to a continuity of the state parameter.

19 Claims, 5 Drawing Sheets

(56) References Cited

U.S. PATENT DOCUMENTS

| | | |
|---|---|---|
| 8,542,879 B1 | 9/2013 | Nechyba et al. |
| 9,690,998 B2 * | 6/2017 | Negi ................. G06K 9/00221 |
| 9,922,238 B2 * | 3/2018 | Bourlai .............. G06K 9/00288 |

FOREIGN PATENT DOCUMENTS

| | | |
|---|---|---|
| CN | 103440479 A | 12/2013 |
| CN | 104683302 A | 6/2015 |
| CN | 104751110 A | 7/2015 |

OTHER PUBLICATIONS

Saptarshi Chakraborty and Dhrubajyoti Das, An Overview of Face Liveness Detection, International Journal on Information Theory (IJIT), vol. 3, No. 2, Apr. 2014 pp. 11-25.

* cited by examiner

FACE LIVENESS DETECTION METHOD, TERMINAL, SERVER AND STORAGE MEDIUM

RELATED APPLICATION

This application is a continuation application of PCT Application No. PCT/CN2016/084677, filed Jun. 3, 2016, which claims priority to Chinese Patent Application No. 201510964347.2, filed with the Chinese Patent Office on Dec. 18, 2015 and entitled "FACE LIVENESS DETECTION METHOD AND APPARATUS," the entire contents of both of which are incorporated herein by reference.

FIELD OF THE TECHNOLOGY

The present disclosure relates to the field of computer technologies and, in particular, to a face liveness detection method, terminal, server, and storage medium.

BACKGROUND OF THE DISCLOSURE

With the development of computer technologies, various applications are accompanied by an identity authentication operation, such as authenticating the identity of an operator by means of face recognition during payment. A personator often attempts to pass the identity authentication by using a photograph or a pre-recorded video. Therefore, detecting liveness during the authentication can be important.

Currently, face liveness detection usually uses a texture categorizer to detect face liveness. A portrait photograph or portrait video of high resolution may be incorrectly determined as a real person, or a real person may not pass the liveness detection when a low-quality video capture device is used, leading to a high error rate.

SUMMARY

Embodiments disclosed according to this application provide a face liveness detection method, terminal, server, and storage medium.

In accordance with the disclosure, there is provided a face liveness detection method including outputting a prompt to complete one or more specified actions in sequence within a specified time period, obtaining a face video, detecting a reference face image frame in the face video using a face detection method, locating a facial keypoint in the reference face image frame, tracking the facial keypoint in one or more subsequent face image frames, determining a state parameter of one of the one or more specified actions using a continuity analysis method according to the facial keypoint, and determining whether the one of the one or more specified actions is completed according to a continuity of the state parameter.

Also in accordance with the disclosure, there is provided a terminal including a processor and a memory storing instructions that, when executed by the processor, cause the processor to output a prompt to complete one or more specified actions in sequence within a specified time period, obtain a face video, detect a reference face image frame in the face video using a face detection method, locate a facial keypoint in the reference face image frame, track the facial keypoint in one or more subsequent face image frames, determine a state parameter of one of the one or more specified actions using a continuity analysis method according to the facial keypoint, and determine whether the one of the one or more specified actions is completed according to a continuity of the state parameter.

Also in accordance with the disclosure, there is provided a server including a processor and a memory storing instructions that, when executed by the processor, cause the processor to receive a face video sent by a terminal, detect a reference face image frame in the face video using a face detection method, locate a facial keypoint in the reference face image frame, track the facial keypoint in one or more subsequent face image frames, determine a state parameter of one of one or more specified actions corresponding to the face video using a continuity analysis method according to the facial keypoint, and determine whether the one of the one or more specified actions is completed according to a continuity of the state parameter.

Details of one or more embodiments of the present disclosure will be provided in the following accompanying drawings and descriptions. Other features, objectives, and advantages of the present disclosure will be clear with reference to the specification, accompanying drawings, and claims.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
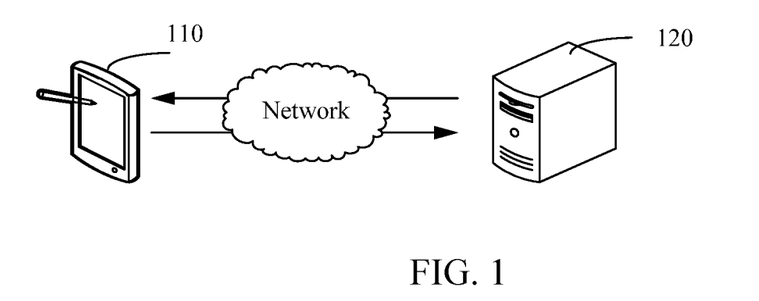
FIG. 1 is a diagram of an application environment of a face liveness detection method according to some embodiments.

FIG. 1 is a diagram of an application environment in which a face liveness detection method is performed consistent with embodiments of the disclosure. As shown in FIG. 1, the application environment includes a terminal 110 and a server 120. The terminal 110 communicates with the server 120 through a network.

The terminal 110 includes a video sequence collection device, which may be, but is not limited to, a smartphone, a tablet computer, a notebook computer, or a desktop computer. The terminal 110 may receive a random action sequence set from the server 120 or send a video sequence to the server 120 by using the network. The server 120 may respond to a detection request sent by the terminal 110.

Figure 2:
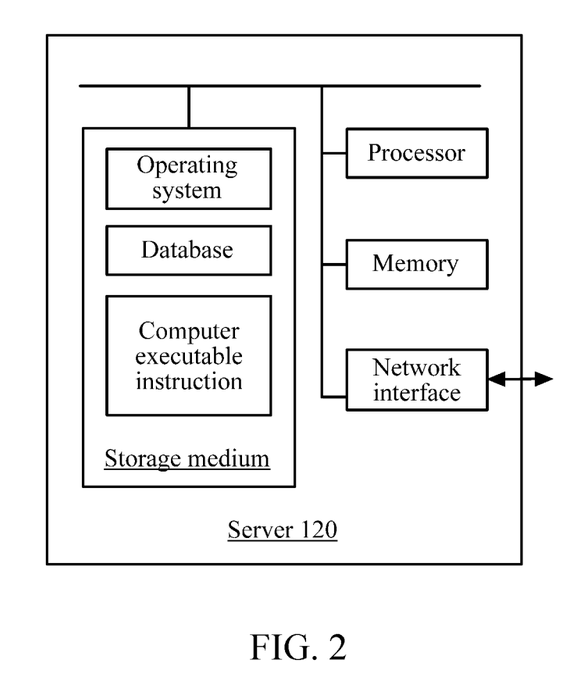
FIG. 2 is an internal structural diagram of a server in FIG. 1 according to some embodiments.

FIG. 2 shows an exemplary internal structure of the server 120 of FIG. consistent with embodiments of the disclosure. The server 120 includes a processor, a storage medium, a memory, and a network interface that are coupled to each other by using a system bus. The storage medium of the server 120 stores, for example, an operating system, a database, and a computer executable instruction. The database is configured to store data, such as a face video of a user. When the instruction is executed by a CPU, a face liveness detection method applicable to the server 120 can be implemented. The processor of the server 120 is configured to provide computation and control capabilities, and support running of the entire server 120. In some embodiments, the processor of the server 120 is configured to execute the instruction stored in the storage medium of the server 120 to perform a face liveness detection method consistent with the disclosure, such as one of the exemplary methods described below. The memory of the server 120 provides, for example, an environment for execution of the computer executable instruction in the storage medium. The network interface of the server 120 is configured to communicate with the external terminal 110 by means of a network connection to, for example, send the random action sequence set to the terminal 110.

Figure 3:
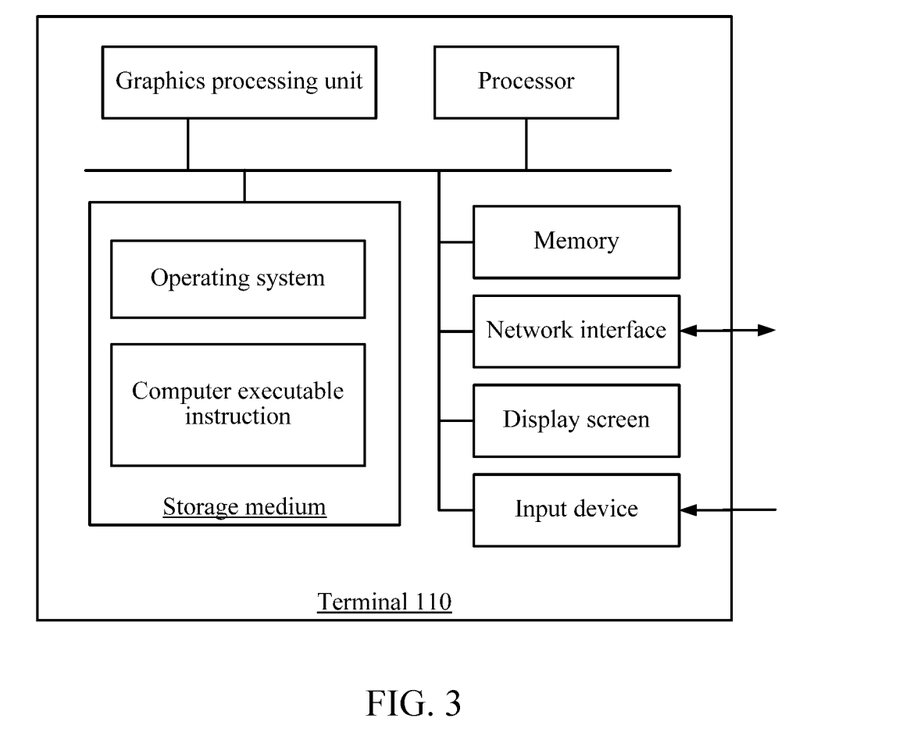
FIG. 3 is an internal structural diagram of a terminal in FIG. 1 according to some embodiments.

FIG. 3 shows an exemplary internal structure of the terminal 110 of FIG. 1 consistent with embodiments of the disclosure. The terminal 110 includes a processor, a graphics processing unit (also referred to as a "graphics processor"), a storage medium, a memory, a network interface, a display screen, and an input device that are coupled to each other by using a system bus. The storage medium of the terminal 110 stores, for example, an operating system and a computer executable instruction. When the instruction is executed by a CPU, a face liveness detection method applicable to the terminal 110 can be implemented. The processor is configured to provide computation and control capabilities, and support running of the entire terminal 110. In some embodiments, the processor of the terminal 110 is configured to execute the instruction stored in the storage medium of the terminal 110 to perform a face liveness detection method consistent with the disclosure, such as one of the exemplary methods described below. The graphics processing unit in the terminal 110 is configured to provide at least a drawing capability of a display interface. The memory provides, for example, an environment for execution of the computer executable instruction in the storage medium. The network interface is configured to perform network communication with the server 120 to, for example, receive the random action sequence set sent by the server 120. The display screen is configured to display an application interface or the like, for example, display an animation of demonstration actions corresponding to a random action sequence in the application interface. The input device includes a camera, configured to, for example, collect a video of a user, and receive a command, data or the like input by the user. For the terminal 110 with a touch screen, the display screen and the input device may include the touch screen.

Figure 4:
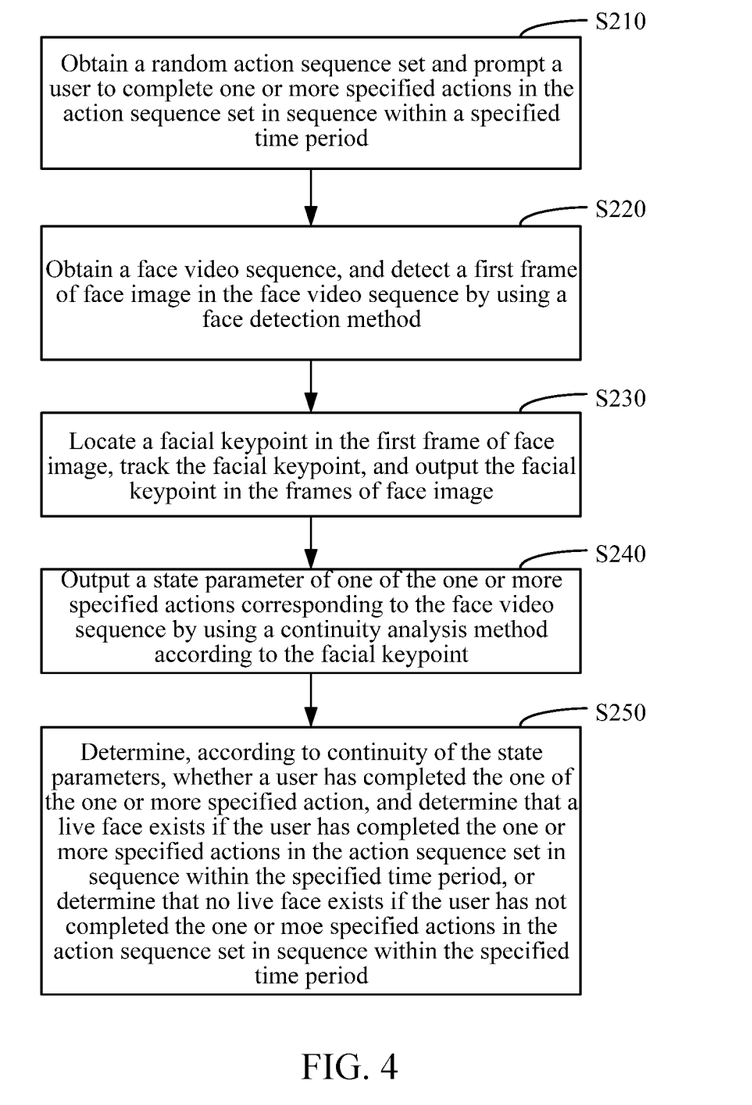
FIG. 4 is a flowchart of a face liveness detection method according to some embodiments.

FIG. 4 shows an exemplary face liveness detection method consistent with embodiments of the disclosure. The method can be implemented in, for example, the server or the terminal in the above-described application environment. As shown in FIG. 4, at S210, a random action sequence set is obtained and a user is prompted to complete one or more specified actions in the action sequence set in sequence within a specified time period. That is, a prompt is output to complete the one or more specified actions in sequence within the specified time period.

In some embodiments, the random action sequence set may be generated by the server or the terminal. For example, the random action sequence set may include shaking head left and right, winking, opening mouth, and shaking head up and down. The random action sequence set is displayed in the terminal. Prompt information may be displayed, e.g., in a form of text or a demonstration video. The prompt information may be displayed one by one to prompt the user to complete the specified actions in the action sequence set in sequence within the specified time period. In some embodiments, the user may be prompted to complete specified actions such as facing a camera as required. In some embodiments, the user may be prompted to complete a specified action within a time period. If generated by the server, the random action sequence set is sent to the terminal. In some embodiments, only a preset number of specified actions in the action sequence set need to be completed, and not all the specified actions need to be completed.

At S220 a face video sequence is obtained, and a first frame of face image in the face video sequence is detected by using a face detection method. The face video sequence may include a face video.

In some embodiments, the face video sequence of the user is collected by using the camera such that frames of face video image in the face video sequence are obtained. In this disclosure, a face video sequence refers to a sequence of frames of video image containing a face and a "frame of face video image" refers to a frame in the video that contains a face, and is also referred to as a "frame of face image" or a "face image frame." Further, the "first frame of face image" can be any one of the frames of face video image that can be used for locating a facial keypoint for subsequent processing as described below, and is also referred to as a "reference frame of face image" or a "reference face image frame."

The face detection method can be used to examine the frames in a chronological order to determine the first frame of face image in the face video image. The face detection method may be self-defined according to requirements. For example, a face detection method based on deep learning can be used. In the deep learning, a more abstract higher-level representation of an attribute category or feature is formed by combining lower-level features, so as to find a distributed feature representation of data. The method is can be applicable to images with more changes.

At S230, a facial keypoint in the first frame of face image is located, the located facial keypoint is tracked, and the facial keypoint in the frames of face image is output. In some embodiments, one or more facial keypoints can be located and tracked.

In some embodiments, a location of a key area on a face can be determined. The facial keypoint can include, for example, eyebrow, eye, nose, mouth, face profile, or the like. A partially covered face and faces at multiple angles are supported. After the facial keypoint of the first frame is located, facial keypoint tracking is performed for a subsequent face image frame, and the facial keypoint of the subsequent face image frame is output. The facial keypoint tracking may use one or more of different tracking methods, such as an optical flow tracking method, a tracking-learning-detection (TLD) tracking method, or a tracking method using a relationship between a previous frame and a latter frame during alignment.

In some embodiments, the face detection method includes a face detection method based on a deep convolutional neural network (CNN), and the facial keypoint on the first frame of face image can be located using a locating method based on the deep CNN.

In some embodiments, the CNN includes a multilayer neural network. Each layer includes multiple two-dimensional planes, and each plane includes multiple individual neurons. Each feature extraction layer (C-layer) in the CNN is followed by a downsampling layer (S-layer) used for local averaging and second extraction. Such a unique twice-feature-extraction structure enables the network to have a relatively high distortion tolerance capability for an input sample during recognition. An input of the face detection method based on the deep CNN includes video images. A face image among the video images is detected. In the facial keypoint locating method based on the deep CNN, training is performed by using the CNN network and the facial keypoint is located on the detected face image. The deep CNN is used to detect a face and locate the facial keypoint, so that the accuracy of detecting and locating can be improved.

At S240, a state parameter of one of the one or more specified actions (also referred to as a "current specified action") corresponding to the face video sequence is output by using a continuity analysis method according to the facial keypoint. In some embodiments, outputting the state parameter includes determining the state parameter, such as determining values of the state parameter in the first frame of face image and in the subsequent face image frame.

In the present disclosure, a value of the state parameter is also referred to as a "state parameter value" or a "state value." Different actions may correspond to different state parameters, which can include state values associated with different facial keypoints. For example, if the specified action is head shaking, the state parameter includes a three-dimensional face angle value of the face. As another example, if the specified action is winking, the state parameter includes a range value of eye opening. Further, if the specified action is mouth opening, the state parameter includes a range value of mouth opening. By using the continuity analysis method, continuous state values can be obtained for a continuous action. Different continuity analysis methods may be used according to different specified actions. For example, if the specified action is head shaking, continuous three-dimensional face angle values may be obtained by means of pose estimation. As another example, if the specified action is mouth opening, continuous range values of mouth opening may be calculated according to a geometric position relationship between keypoints of facial features or by using a regressor. When the continuity analysis method is used to determine an action, if the action is performed by a real person, the state parameter of the action should include continuous values. This is because, when the real person performs the action, the action is completed in a continuous and progressive manner. For example, if the specified action is head shaking, changing of the face angle includes a continuous angle changing process.

At S250, whether the user has completed the one of the one or more specified action is determined according to a continuity of the state parameter. If the user has completed the one or more specified actions in the action sequence set in sequence within the specified time period, it is determined that a live face exists. On the other hand, if the user has not completed the one or more specified actions in the action sequence set in sequence within the specified time period, then it is determined that no live face exits.

In some embodiments, whether an action is completed by a real person may be determined according to a discontinuity of the state parameter. A discontinuity value indicates that the action is not completed by a real person. If the action is completed by using a photograph masquerading as a real person, the action on the photograph is usually discontinuous, without a continuous changing process. In a conventional determination method, a categorizer is usually used for determination. A categorized result output by the categorizer is discrete, without continuity. For example, for the mouth opening action, two photographs can be used, one showing a fully open mouth, and the other showing a completely closed mouth. The two photographs may successfully pass an identity authentication according to the conventional determination method. On the other hand, using a determination method according to the continuity of the state parameter consistent with embodiments of the disclosure to determine whether the user has completed the current specified action can improve the determination accuracy. In some embodiments, to determine whether the user has completed a specified action according to the continuity of the state parameter, a preset state parameter value, also referred to as a "threshold state parameter value," that needs to be reached when the action is successfully completed may be preset. For example, a series of multiple continuously changing state parameter values may be set, and the accuracy of each state parameter may be proactively set, for example, to two decimal places. If the state parameter of any of the one or more specified actions corresponding to the face video sequence is missing, it can be determined that no live face exists. This method improves the accuracy of face liveness detection. In addition, it is determined that a live face exists only when the user has completed the one or more specified actions in the action sequence set in sequence within the specified time period. Because the one or more specified actions in the action sequence set are random, and the number of times for completing each action may be proactively set, the accuracy of the detection is further ensured.

Consistent with the disclosure, a random action sequence set is obtained to prompt a user to complete one or more specified actions in the action sequence set in sequence within a specified time period, a face video sequence is obtained, a first frame of face image in the face video sequence is detected by using a face detection method, a facial keypoint on the first frame of face image is located, the facial keypoint is tracked, the facial keypoint of each of one or more of the frames is output, a state parameter of an action corresponding to the face video sequence is output by using a continuity analysis method according to the facial keypoint, whether the user has completed a current specified action is determined according to a continuity of the state parameter, and if the user has completed the one or more specified actions in the action sequence set in sequence within the specified time period, it is determined that a live face exists, or if the user has not completed the one or more specified actions in the action sequence set in sequence within the specified time period, it is determined that no live face exists. Determining whether the user has completed the current specified action according to the continuity of the state parameter refers to that not only an endpoint state of the specified actions needs to be completed, but also a continuity of the action from one endpoint state to another endpoint state needs to be ensured. A fake video usually is discontinuous when an action is completed. Therefore, according to the present disclosure, the accuracy of face liveness detection can be improved.

In some embodiments, the current specified action includes head shaking, then outputting the state parameter of the action corresponding to the face video sequence by using the continuity analysis method according to the facial keypoint (S240) includes performing a pose estimation according to the facial keypoint of one or more of the frames of face image to obtain continuous three-dimensional face angles.

In some embodiments, different face directions refer to different face poses, and the three-dimensional face angles can be obtained by analyzing a position of the facial keypoint and a proportion of facial features, and can be used as the state parameter values. Because the pose estimation capable of obtaining the continuous three-dimensional face angles is used, the obtained three-dimensional face angles include continuous values, and may be decimals, and decimal places to which the values are accurate may be self-defined. Using shaking head left and right as an example, if the three-dimensional face angle changes gradually from 20 degrees leftward to 20 degrees rightward, it is determined that the current specified action is successfully completed. If a jumping value occurs, or one or more specified state values are not reached, it is determined that no live face exists.

In some embodiments, the current specified action includes winking or mouth opening, then outputting the state parameter of the action corresponding to the face video sequence by using the continuity analysis method according to the facial keypoint (S240) includes outputting continuous state values of the action corresponding to the face video sequence by using a regressor. The continuous state values correspond to an opening range of the current specified action.

In some embodiments, the state values output by using the regressor include continuous values between 0 and 1, and the decimal places to which the values are accurate may be self-defined. For example, a support vector regressor (SVR) may be used. For a frame of image, a state value can be output by using the regressor, and the state value can be used as the value of the state parameter. The state value is directly proportional to the range of eye opening or mouth opening. Whether the entire action completion process is continuous or discontinuous is determined according to the continuity of the range changing. Using the action of mouth opening as an example, if the state value corresponding to the range of mouth opening continuously changes from 0 to 1, it can be determined that the current specified action is successfully completed. In contrast, if a jump value occurs, or some specified state values are not reached, it can be determined that the current specified action is not successfully completed.

In some embodiments, determining whether the user has completed the current specified action according to the continuity of the state parameter (S250) includes determining whether a difference between any two adjacent state parameter values is greater than a preset threshold, and determining that the current specified action is not successfully completed if the difference is greater than the preset threshold, or determining that the current specified action is successfully completed if the difference is not greater than the preset threshold.

The two adjacent state parameter values refer to state parameter values obtained by analyzing two adjacent face images obtained in chronological order. If the difference between the two adjacent state parameter values is greater than the preset threshold, it indicates that there is a jump value, the completion of the actions is fake, and the current specified action is not successfully completed. A determination result can be obtained as long as a difference between any two adjacent state parameter values is greater than the preset threshold. This is quick and convenient.

In some embodiments, the method further includes determining a category of a face image in the face video sequence by using a categorizer, and determining that the specified action is not successfully completed if the face image is an abnormal face.

Specifically, a personator may attempt to pass a conventional identity authentication by completing actions behind a face photograph with holes. For example, a paper mask can be made by cutting off eye parts and a mouth part on a face image, and the personator may pass the conventional face liveness detection by winking, opening mouth, or shaking head behind the paper mask. Consistent with embodiments of the disclosure, an abnormality detector is provided. Whether a category of the face image in the face video sequence includes an abnormal face, e.g., a fake face, can be determined first by using the categorizer generated by means of training. If the face image is a fake face, it is determined that the current specified action is not successfully completed. Normal face images and paper mask images may be collected as two categories to train the categorizer before the categorizer is used. In some embodiments, features may be extracted first, and then the categorizer, such as a support vector machine (SVM), is trained. In some other embodiments, images can be directly used to train a CNN categorizer. Thus, a successfully trained categorizer can be obtained for subsequent classification of normal faces and abnormal faces and detection of abnormal faces. By means of abnormal face detection, the accuracy of the face liveness detection is further improved.

Figure 5:
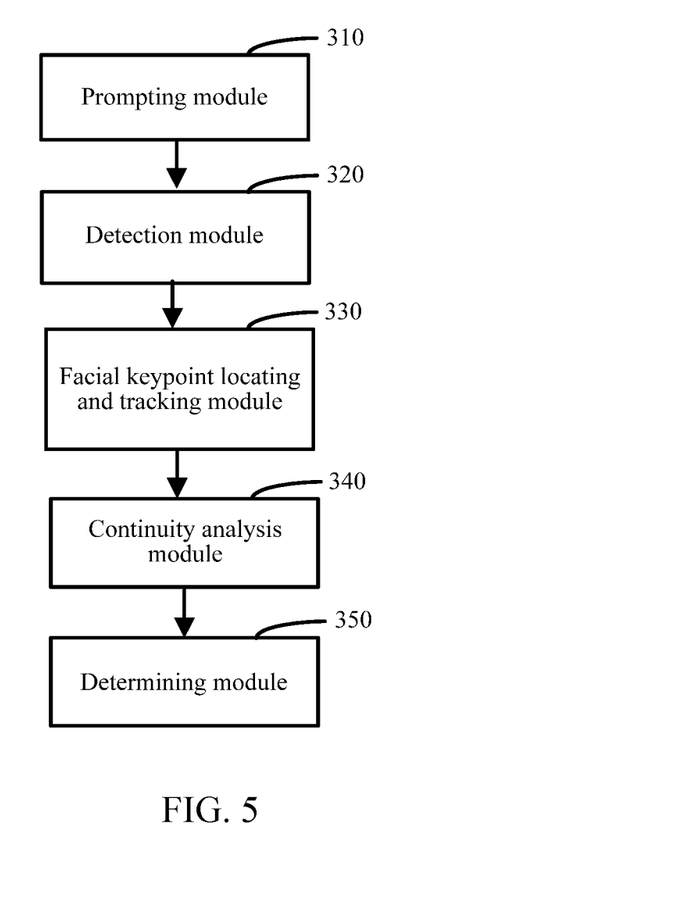
FIG. 5 is a structural block diagram of a terminal according to some embodiments.

FIG. 5 shows a block diagram of a structure of an exemplary terminal consistent with the disclosure. The terminal includes a memory storing instructions and a processor configured to execute the instructions to perform a method consistent with the disclosure, such as one of the above-described exemplary methods. As shown in FIG. 5, the terminal includes a prompting module 310, a detection module 320, a facial keypoint locating and tracking module 330, a continuity analysis module 340, and a determining module 350.

The prompting module 310 is configured to obtain a random action sequence set and prompt a user to complete one or more specified actions in the action sequence set in sequence within a specified time period.

The detection module 320 is configured to obtain a face video sequence, and detect a first frame of face image, i.e., a reference frame of face image or a reference face image frame, in the face video sequence by using a face detection method.

The facial keypoint locating and tracking module 330 is configured to locate a facial keypoint in the first frame of face image, track the facial keypoint, and output the facial keypoint in frames of video face image of the face video sequence.

The continuity analysis module 340 is configured to output a state parameter of one of the one or more specified actions corresponding to the face video sequence by using a continuity analysis method according to the facial keypoint.

The determining module 350 is configured to determine whether a user has completed the one of the one or more specified actions according to a continuity of the state parameter. If the user has completed the one or more specified actions in the action sequence set in sequence within the specified time period, the determining module 350 can determine that a live face exists. In contrast, if the user has not completed the one or more specified actions in the action sequence set in sequence within the specified time period, the determining module 350 can determine that a live face does not exist.

In some embodiments, the face detection method is a face detection method based on a deep CNN, and locating the facial keypoint in the first frame of face image can use a locating method based on the deep CNN.

In some embodiments, the current specified action includes head shaking, and the continuity analysis module 340 is further configured to perform a pose estimation according to the facial keypoint of one or more of the frames of face image to obtain continuous three-dimensional face angles.

In some embodiments, the current specified action includes winking or mouth opening, and the continuity analysis module 340 is further configured to output continuous state values of the action corresponding to the face video sequence by using a regressor. The continuous state values correspond to an opening range of the current specified action.

In some embodiments, the determining module 350 is further configured to determine whether a difference between any two adjacent state parameter values is greater than a preset threshold, and determine that the current specified action is not successfully completed if the difference is greater than the preset threshold, or determine that the current specified action is successfully completed if the difference is not greater than the preset threshold.

Figure 6:
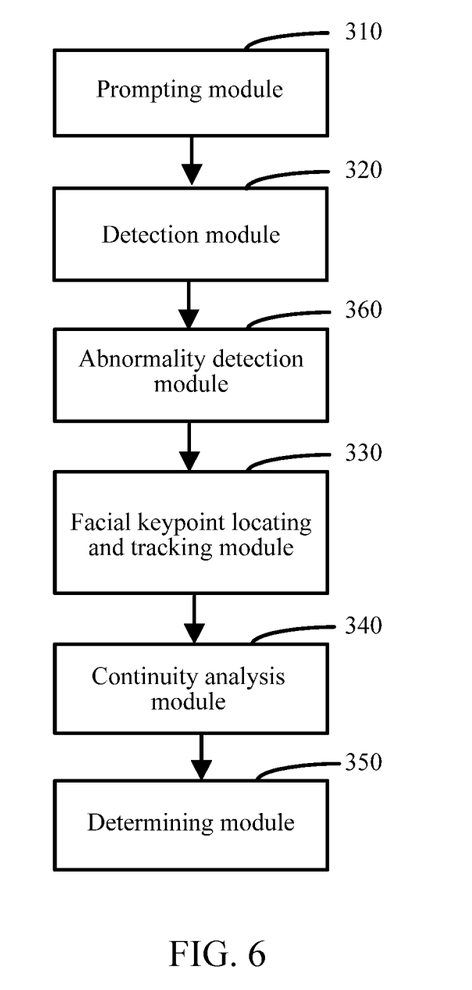
FIG. 6 is a structural block diagram of a device according to another embodiment.

FIG. 6 shows a block diagram of a structure of an exemplary device consistent with embodiments of the disclosure. The device can be, for example, a terminal. As shown in FIG. 6, the device includes the prompting module 310, the detection module 320, the facial keypoint locating and tracking module 330, the continuity analysis module 340, the determining module 350, and an abnormality detection module 360. The abnormality detection module 360 is configured to determine a category of a face image in the face video sequence by using a categorizer, and determine that the specified action is not successfully completed if the face image includes an abnormal face.

In some embodiments, a server including a memory and a processor is provided. The memory stores instructions. When executed by the processor, the instructions cause the processor to obtain a random action sequence set and prompt a user to complete one or more specified actions in the action sequence set in sequence within a specified time period, receive a face video sequence sent by a terminal, detect a first frame of face image in the face video sequence by using a face detection method, locate a facial keypoint in the first frame of face image, track the facial keypoint, output the facial keypoint in the frames of face image, output a state parameter of one of the one or more specified actions corresponding to the face video sequence by using a continuity analysis method according to the facial keypoint, and determine whether the user has completed the one of the one or more specified actions according to a continuity of the state parameters. If the user has completed the one or more specified actions in the action sequence set in sequence within the specified time period, the instructions cause the processor to determine that a live face exists. On the other hand, if the user has not completed the one or more specified actions in the action sequence set in sequence within the specified time period, the instructions cause the processor to determine that no live face exists.

In some embodiments, the face detection method includes a face detection method based on a deep CNN, and locating the facial keypoint in the first frame of face image uses a locating method based on the deep CNN.

In some embodiments, the current specified action includes head shaking, and outputting by the processor the state parameter of the action corresponding to the face video sequence by using the continuity analysis method according to the facial keypoint includes performing a pose estimation according to the facial keypoint of one or more of the frames of face image to obtain continuous three-dimensional face angles.

In some embodiments, the current specified action includes winking or mouth opening, and outputting by the processor the state parameter of the action corresponding to the face video sequence by using the continuity analysis method according to the facial keypoint (S240) includes outputting continuous state values of the action corresponding to the face video sequence by using a regressor. The continuous state values correspond to an opening range of the current specified action.

In some embodiments, determining by the processor whether the user has completed the current specified action according to the continuity of the state parameter includes determining whether a difference between any two adjacent state parameter values is greater than a preset threshold, and determining that the current specified action is not successfully completed if the difference is greater than the preset threshold, or determining that the current specified action is successfully completed if the difference is not greater than the preset threshold.

In some embodiments, when executed by the processor, the instructions further cause the processor to determine a category of a face image in the face video sequence by using a categorizer, and determine that the specified action is not successfully completed if the face image includes an abnormal face.

In some embodiments, one or more non-volatile computer-readable storage media storing computer-readable instructions are provided. When executed by one or more processors, the computer-readable instructions cause the one or more processors to obtain a random action sequence set and prompt a user to complete one or more specified actions in the action sequence set in sequence within a specified time period, receive a face video sequence sent by a terminal, detect a first frame of face image in the face video sequence by using a face detection method, locate a facial keypoint in the first frame of face image, track the facial keypoint, output the facial keypoint in the frames of face image, output a state parameter of a specified action corresponding to the face video sequence by using a continuity analysis method according to the facial keypoint, and determine whether the user has completed the specified action according to continuity of the state parameters. If the user has completed the one or more specified actions in the action sequence set in sequence within the specified time period, the instructions cause the processor to determine that a live face exists. On the other hand, if the user has not completed the one or more specified actions in the action sequence set in sequence within the specified time period, the instructions cause the processor to determine that no live face exists.

A person of ordinary skill in the art may understand that all or some of the procedures of the methods in the embodiments may be implemented by a computer program instructing relevant hardware. The program may be stored in a computer readable storage medium. When the program runs, the procedures of the method may be performed. The storage medium may be a non-volatile memory such as a magnetic disk, an optical disc, or a read-only memory (ROM), or a random access memory (RAM), or the like.

Technical features of the embodiments described above may be arbitrarily combined with each other. For brevity of description, not all possible combinations of the technical features of the embodiments are described. However, as long as there is no contradiction between the combinations of these technical features, all the combinations should be considered as falling within the scope of the disclosure.

The embodiments described above show merely some implementations of the present disclosure, which are described specifically and in detail, but should not be understood as a limitation to the patent scope of the present disclosure. It should be noted that, a person of ordinary skill in the art may further make some variations and improvements without departing from the concept of the present disclosure, and the variations and improvements fall within the scope of the present disclosure. The protection scope of the present disclosure shall be subject to the appended claims.

What is claimed is:

1. A face liveness detection method comprising:
   displaying a prompt instructing a user to complete one or more specified actions in a specified sequence within a specified time period;
   obtaining a face video;
   detecting a reference face image frame in the face video using a face detection method;
   locating a facial keypoint in the reference face image frame;
   tracking the facial keypoint in one or more subsequent face image frames;
   for each one of the one or more specified actions,
      determining a state parameter of one of the one or more specified actions using a continuity analysis method according to the facial keypoint; and
      determining, according to a continuity of the state parameter, whether the one of the one or more specified actions is completed;
   determining that a live face exists if it is determined that all of the one or more specified actions as instructed in the displayed prompt is completed in the specified sequence within the specified time period; and
   determining that no live face exists if it is determined that the one or more specified actions as instructed in the displayed prompt is not completed in the specified sequence within the specified time period.

2. The method according to claim 1, wherein:
   detecting the reference face image frame using the face detection method includes detecting the reference face image frame using a face detection method based on deep convolutional neural network (CNN), and
   locating the facial keypoint in the reference face image frame includes locating the facial keypoint using a locating method based on the deep CNN.

3. The method according to claim 1, wherein:
   the one of the one or more specified actions includes head shaking, and
   determining the state parameter of the one of the one or more specified actions using the continuity analysis method according to the facial keypoint includes performing a pose estimation according to the facial keypoint in the reference face image frame and the one or more subsequent face image frames to obtain continuous three-dimensional face angles.

4. The method according to claim 1, wherein:
   the one of the one or more specified actions includes winking or mouth opening, and
   determining the state parameter of the one of the one or more specified actions using the continuity analysis method according to the facial keypoint includes determining continuous state values of the one of the one or more specified actions using a regressor, the continuous state values corresponding to an opening range of the one of the one or more specified actions.

5. The method according to claim 1, wherein determining whether the one of the one or more specified actions is completed according to the continuity of the state parameter includes:
   determining whether a difference between any two adjacent values of the state parameter is greater than a preset threshold; and
   determining that the one of the one or more specified actions is not successfully completed, if the difference is greater than the preset threshold, or
   determining that the one of the one or more specified actions is successfully completed, if the difference is not greater than the preset threshold.

6. The method according to claim 1 further comprising:
   determining a category of a face image in the face video using a categorizer; and
   determining that the one of the one or more specified actions is not successfully completed, if the face image is an abnormal face.

7. The method according to claim 1, wherein determining, according to a continuity of the state parameter, whether the one of the one or more specified actions is completed comprises:
   determining that the one of the one or more specified actions is completed if values included in the state parameter are continuous; and
   determining that the one of the one or more specified actions is not completed if a jumping value occurs in the state parameter.

8. The method according to claim 1, wherein displaying a prompt instructing a user to complete one or more specified actions in a specified sequence within a specified time period comprises:
   receiving, by a terminal, a random action sequence set from a server; and
   displaying, by the terminal, an animation or a text of demonstration actions corresponding to the random action sequence as the prompt.

9. A terminal comprising:
   a processor; and
   a memory storing instructions that, when executed by the processor, cause the processor to:
      display a prompt instructing a user to complete one or more specified actions in a specified sequence within a specified time period;
      obtain a face video;
      detect a reference face image frame in the face video using a face detection method;
      locate a facial keypoint in the reference face image frame;
      track the facial keypoint in one or more subsequent face image frames;
      for each one of the one or more specified actions,
         determine a state parameter of one of the one or more specified actions using a continuity analysis method according to the facial keypoint; and
         determine, according to a continuity of the state parameter, whether the one of the one or more specified actions is completed;
      determine that a live face exists if it is determined that all of the one or more specified actions as instructed in the displayed prompt is completed in the specified sequence within the specified time period; and
      determine that no live face exists if it is determined that the one or more specified actions as instructed in the displayed prompt is not completed in the specified sequence within the specified time period.

10. The terminal according to claim 9, wherein the instructions further cause the processor to:
detect the reference face image frame using a face detection method based on deep convolutional neural network (CNN), and
locate the facial keypoint using a locating method based on the deep CNN.

11. The terminal according to claim 9, wherein:
the one of the one or more specified actions includes head shaking, and
the instructions further cause the processor to perform a pose estimation according to the facial keypoint in the reference face image frame and the one or more subsequent face image frames to obtain continuous three-dimensional face angles.

12. The terminal according to claim 9, wherein:
the one of the one or more specified actions includes winking or mouth opening, and
the instructions further cause the processor to determine continuous state values of the one of the one or more specified actions using a regressor, the continuous state values corresponding to an opening range of the one of the one or more specified actions.

13. The terminal according to claim 9, wherein the instructions further cause the processor to:
determine whether a difference between any two adjacent values of the state parameter is greater than a preset threshold; and
determine that the one of the one or more specified actions is not successfully completed, if the difference is greater than the preset threshold, or
determine that the one of the one or more specified actions is successfully completed, if the difference is not greater than the preset threshold.

14. The terminal according to claim 9, wherein the instructions further cause the processor to:
determine a category of a face image in the face video using a categorizer; and
determine that the one of the one or more specified actions is not successfully completed, if the face image is an abnormal face.

15. A server comprising:
a processor; and
a memory storing instructions that, when executed by the processor, cause the processor to:
send a prompt to a terminal to be displayed, the prompt instructing a user to complete one or more specified actions in a specified sequence within a specified time period;
receive a face video sent by the terminal,
detect a reference face image frame in the face video using a face detection method;
locate a facial keypoint in the reference face image frame;
track the facial keypoint in one or more subsequent face image frames;
for each one of the one or more specified actions,
determine a state parameter of one of one or more specified actions corresponding to the face video using a continuity analysis method according to the facial keypoint; and
determine, according to a continuity of the state parameter, whether the one of the one or more specified actions is completed;
determine that a live face exists if it is determined that all of the one or more specified actions as instructed in the prompt is completed in the specified sequence within the specified time period; and
determine that no live face exists if it is determined that the one or more specified actions as instructed in the prompt is not completed in the specified sequence within the specified time period.

16. The server according to claim 15, wherein the instructions further cause the processor to:
detect the reference face image frame using a face detection method based on deep convolutional neural network (CNN), and
locate the facial keypoint using a locating method based on the deep CNN.

17. The server according to claim 15, wherein:
the one of the one or more specified actions includes head shaking, and
the instructions further cause the processor to perform a pose estimation according to the facial keypoint in the reference face image frame and the one or more subsequent face image frames to obtain continuous three-dimensional face angles.

18. The server according to claim 15, wherein:
the one of the one or more specified actions includes winking or mouth opening, and
the instructions further cause the processor to determine continuous state values of the one of the one or more specified actions using a regressor, the continuous state values corresponding to an opening range of the one of the one or more specified actions.

19. The server according to claim 15, wherein the instructions further cause the processor to:
determine whether a difference between any two adjacent values of the state parameter is greater than a preset threshold; and
determine that the one of the one or more specified actions is not successfully completed, if the difference is greater than the preset threshold, or
determine that the one of the one or more specified actions is successfully completed, if the difference is not greater than the preset threshold.

* * * * *